United States Patent
Kailey et al.

(10) Patent No.: US 11,373,294 B2
(45) Date of Patent: Jun. 28, 2022

(54) PRINT DEFECT DETECTION MECHANISM

(71) Applicants: Walter F. Kailey, Frederick, CO (US); Carl M. Dennison, Longmont, CO (US)

(72) Inventors: Walter F. Kailey, Frederick, CO (US); Carl M. Dennison, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 123 days.

(21) Appl. No.: 17/034,262

(22) Filed: Sep. 28, 2020

(65) Prior Publication Data
US 2022/0101505 A1 Mar. 31, 2022

(51) Int. Cl.
*G06T 7/00* (2017.01)
(52) U.S. Cl.
CPC .... *G06T 7/001* (2013.01); *G06T 2207/10008* (2013.01); *G06T 2207/10024* (2013.01); *G06T 2207/30144* (2013.01)
(58) Field of Classification Search
CPC ........... G06T 7/001; G06T 2207/10008; G06T 2207/10024; G06T 2207/30144
See application file for complete search history.

(56) References Cited

U.S. PATENT DOCUMENTS

| | | | |
|---|---|---|---|
| 6,968,076 B1 | 11/2005 | Ou Yang et al. | |
| 7,239,738 B2 | 7/2007 | Yasukawa et al. | |
| 7,519,222 B2 | 4/2009 | Kisilev et al. | |
| 7,646,908 B2 | 1/2010 | Onishi | |
| 7,650,019 B2 | 1/2010 | Turke et al. | |
| 8,259,350 B2 | 9/2012 | Wu et al. | |
| 8,311,312 B1 * | 11/2012 | Richardson | G01N 21/952 382/141 |
| 8,472,073 B2 | 6/2013 | Dennison | |
| 8,654,369 B2 | 2/2014 | Kogan | |
| 8,831,381 B2 | 9/2014 | Baheti et al. | |
| 8,867,796 B2 | 10/2014 | Vans et al. | |
| 9,077,927 B2 | 7/2015 | Miyagawa et al. | |
| 9,082,009 B2 | 7/2015 | Chang et al. | |
| 9,524,545 B2 | 12/2016 | Fukase | |
| 9,762,750 B2 | 9/2017 | Huber et al. | |

(Continued)

FOREIGN PATENT DOCUMENTS

DE 102016204506 A1 10/2016

OTHER PUBLICATIONS

Zhang, E., Li, B., Li, P., & Chen, Y. (2019). A Deep Learning Based Printing Defect Classification Method with Imbalanced Samples. Symmetry, 11(12), 1440, 14 pages.

(Continued)

*Primary Examiner* — Pinalben Patel
(74) *Attorney, Agent, or Firm* — Jaffery Watson Mendonsa & Hamilton LLP (57) ABSTRACT

A method is disclosed. The method includes receiving one or more images of bitmap data applied to a print medium as print medium image data, register the print medium image data to the bitmap data, detecting one or more candidate defects based on whether a difference between the print medium image data at a location and the bitmap data at the location exceeds a predetermined threshold, detecting one or more defects among the candidate defects and transmitting information about the one or more candidate defects classified as defects.

22 Claims, 9 Drawing Sheets

(56) References Cited

U.S. PATENT DOCUMENTS

| | | | |
|---|---|---|---|
| 10,976,974 B1* | 4/2021 | Dennison | G06F 3/1247 |
| 2004/0155916 A1 | 8/2004 | Uchiyama et al. | |
| 2008/0260395 A1 | 10/2008 | Honma | |
| 2011/0149331 A1 | 6/2011 | Duggan et al. | |
| 2015/0078627 A1* | 3/2015 | Fukase | G06T 7/001 |
| | | | 382/112 |
| 2019/0102270 A1* | 4/2019 | Dennison | G06F 3/121 |
| 2019/0215410 A1* | 7/2019 | d'Armancourt | G06T 7/254 |

OTHER PUBLICATIONS

Yangping, W. et al. (Jan. 2018). Real-time defect detection method for printed images based on grayscale and gradient differences. Journal of Engineering Science and Technology Review 11(1), 180-188.

Online sheet-fed inspection system. (May 2019). DAC Engineering. Retrieved from http://www.dac-eng.co.jp/eng/products/online.html.

* cited by examiner

PRINT DEFECT DETECTION MECHANISM

FIELD OF THE INVENTION

The invention relates to the field of printing systems, and in particular, to image processing in a printing system.

BACKGROUND

High speed print production systems often implement a print verification system (PVS) to detect defects in print data applied to a medium (e.g., paper). Print defects most often result from impurities included in the medium, or from partial drying and clumping of ink at the mouth of print nozzles. While some defects are acceptable, others cause printed matter to be rejected and destroyed. However, the process of inspecting, as well as accepting or rejecting, currently requires operator intervention, which is time consuming.

Accordingly, an improved defect detection mechanism is desired.

SUMMARY

In one embodiment, a system includes at least one physical memory device to store print verification system logic and one or more processors coupled with at least one physical memory device to execute the print verification logic to receive one or more images of bitmap data applied to a print medium as print medium image data, register the print medium image data to the bitmap data, detect one or more candidate defects based on whether a difference between the print medium image data at a location and the bitmap data at the location exceeds a predetermined threshold, detect one or more defects among the candidate defects, including determining a size of a candidate defect, determining that the candidate defect comprises a defect upon a determination that the size of the candidate defect exceeds a critical size threshold, computing an original variance value associated with an image included in the bitmap data at a first region associated with the defect, computing a difference variance value associated with the image in the candidate defect at the first region and classifying the defect as an unacceptable upon a determination that the original variance value is less than the difference variance value, and transmit information about the one or more candidate defects classified as defects.

BRIEF DESCRIPTION OF THE DRAWINGS

A better understanding of the present invention can be obtained from the following detailed description in conjunction with the following drawings, in which.

DETAILED DESCRIPTION

A mechanism to detect defects in a print medium is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "calculator" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
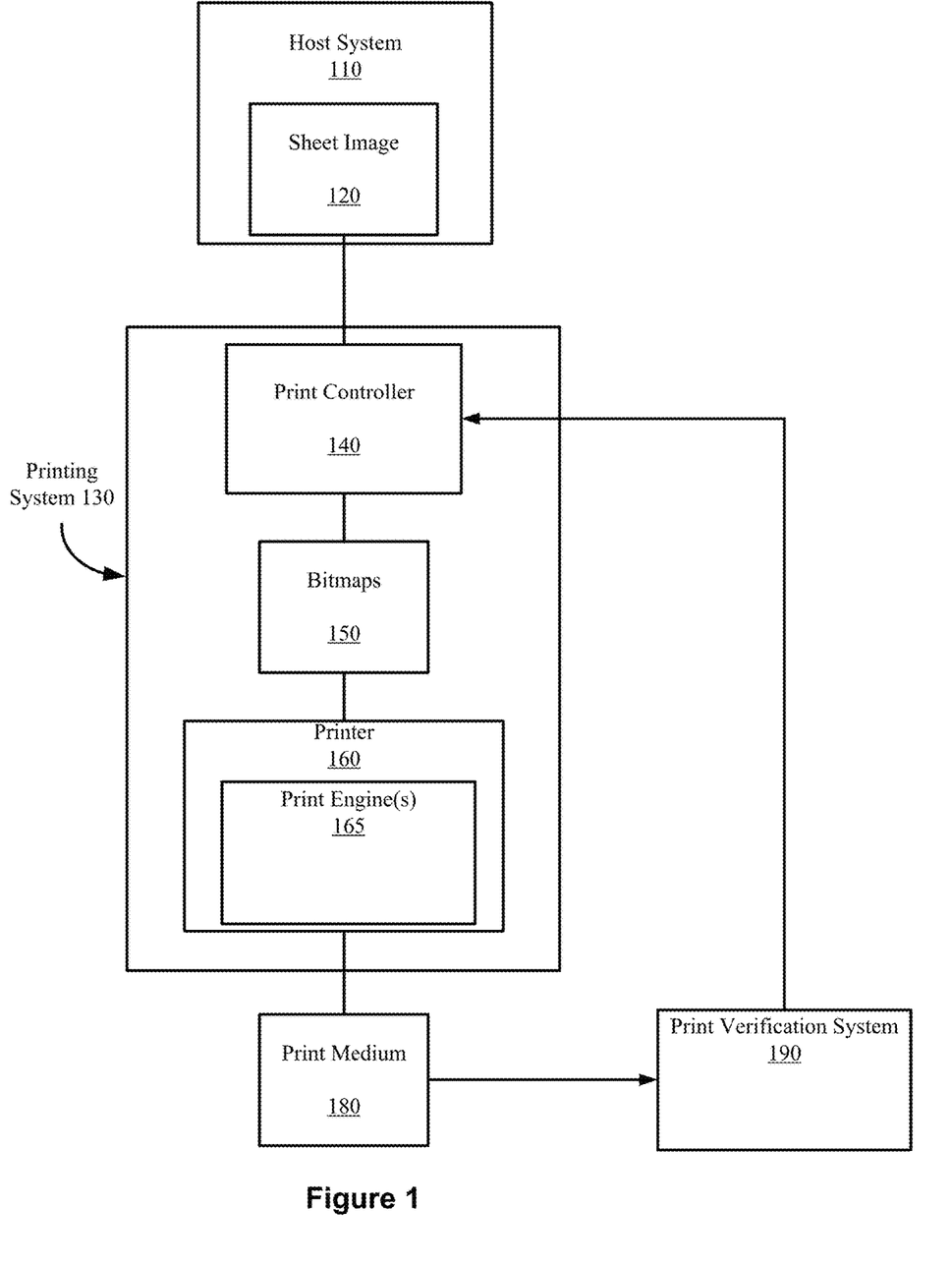
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, cloud infrastructure, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 having one or more print engines 165 to present the bitmap 150 onto the print medium 180 via marking material (e.g., toner, ink, coatings, etc.) based on the sheet image 120.

Print controller 140 and printer 160 may be both implemented in the same printing system 130 or implemented separately and coupled together. In another embodiment, print controller 140 may be implemented in host system 110 and coupled to printer 160. Print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

In one embodiment, print verification system (PVS) 190 is implemented to record print quality defects on the substrate. Print quality defects may be defects from faulty print marking on the substrate and/or physical defects in the substrate (e.g., impurities, spots, stains, flutter, cockle, wrinkles and/or z-direction defects). In one embodiment, PVS 190 may report results of any detected defects to print controller 140 for further processing. PVS 190 may be a stand-alone component or may be integrated into the printing system 130.

Figure 2:
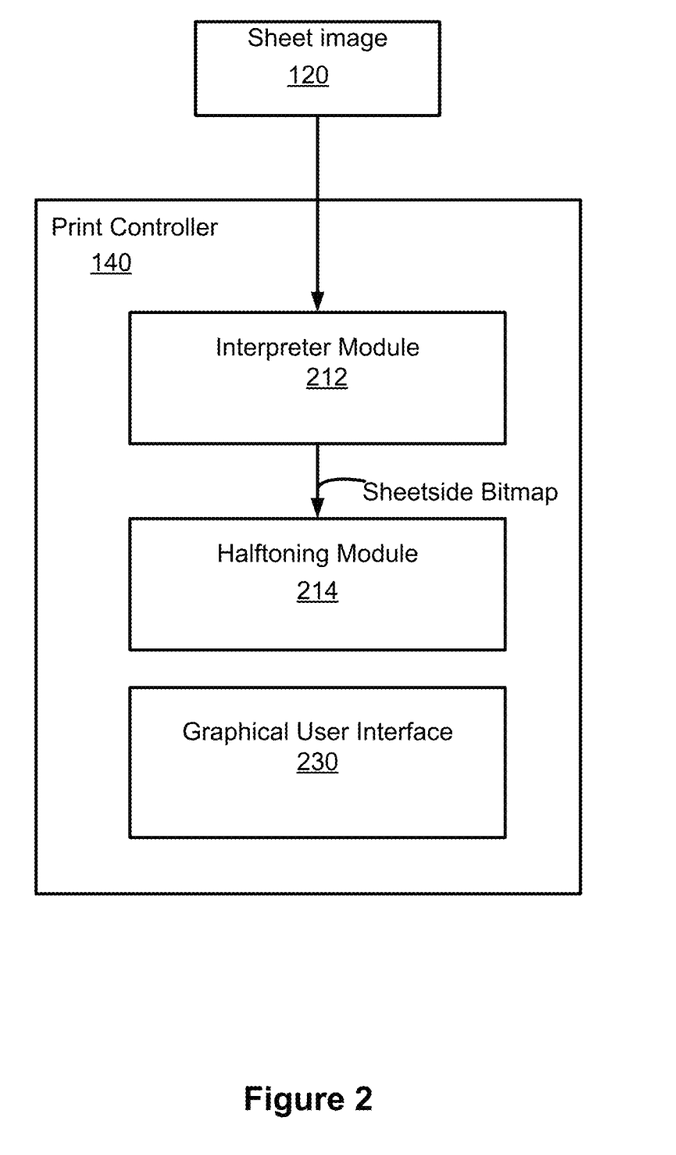
FIG. 2 is a block diagram illustrating one embodiment of a print controller.

FIG. 2 illustrates one embodiment of a print controller 140. As shown in FIG. 2, print controller 140 (e.g., DFE or digital front end), in its generalized form, includes interpreter module 212 and halftoning module 214. Interpreter module 212 is operable to interpret, render, rasterize, or otherwise convert images (e.g., raw sheetside images such as sheet image 120) of a print job into sheetside bitmaps.

The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the set of pixels for the image. In one embodiment, interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pixels to halftone patterns of CMYK ink for application to the paper. A halftone design may comprise a pre-defined mapping of input pixel gray levels to output drop sizes based on pixel location.

Figure 3:
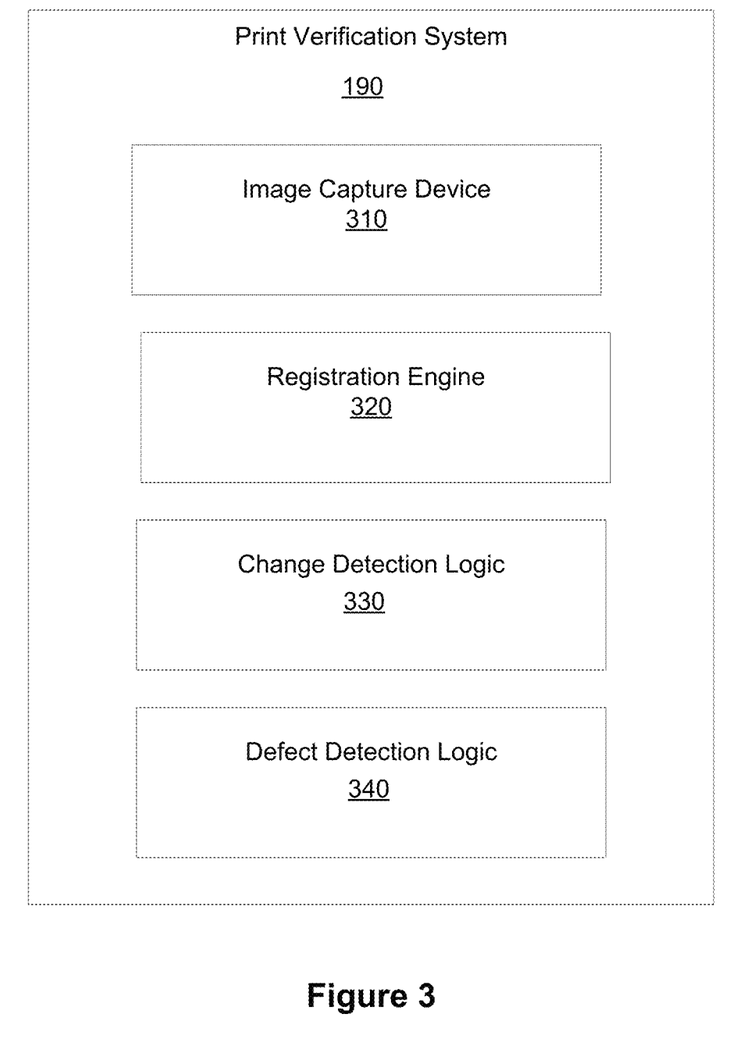
FIG. 3 illustrates one embodiment of a print verification system.

FIG. 3 illustrates one embodiment of PVS 190, including an image capture device 310, registration engine 320, change detection logic 330 and defect detection logic 340. In one embodiment, image capture device 310 includes one or more cameras. However in other embodiments, image capture device 310 may include different types of image capture devices. Image capture device 310 may provide measurements (e.g., reflectance, intensity, etc.) of the images for each of one or more color bands. In such embodiments, image capture device 310 captures (or scans) images of the print medium after the bitmap print data (or bitmap data) has been applied to the print medium using the marking material. The image capture device 310 may transmit the resulting print medium image data corresponding to one or more color bands (e.g., red, green, blue etc.).

Registration engine 320 receives the resulting print medium image data (e.g., print image) and registers the print medium image data with the bitmap print image data (e.g., bitmap image). According to one embodiment, a registration process may be implemented by performing color transformation, rotation, skew transformation, translation, and/or scaling operations on the print medium images and/or the bitmap images to obtain a matched alignment between the print medium images and bitmap images.

Figure 4A:
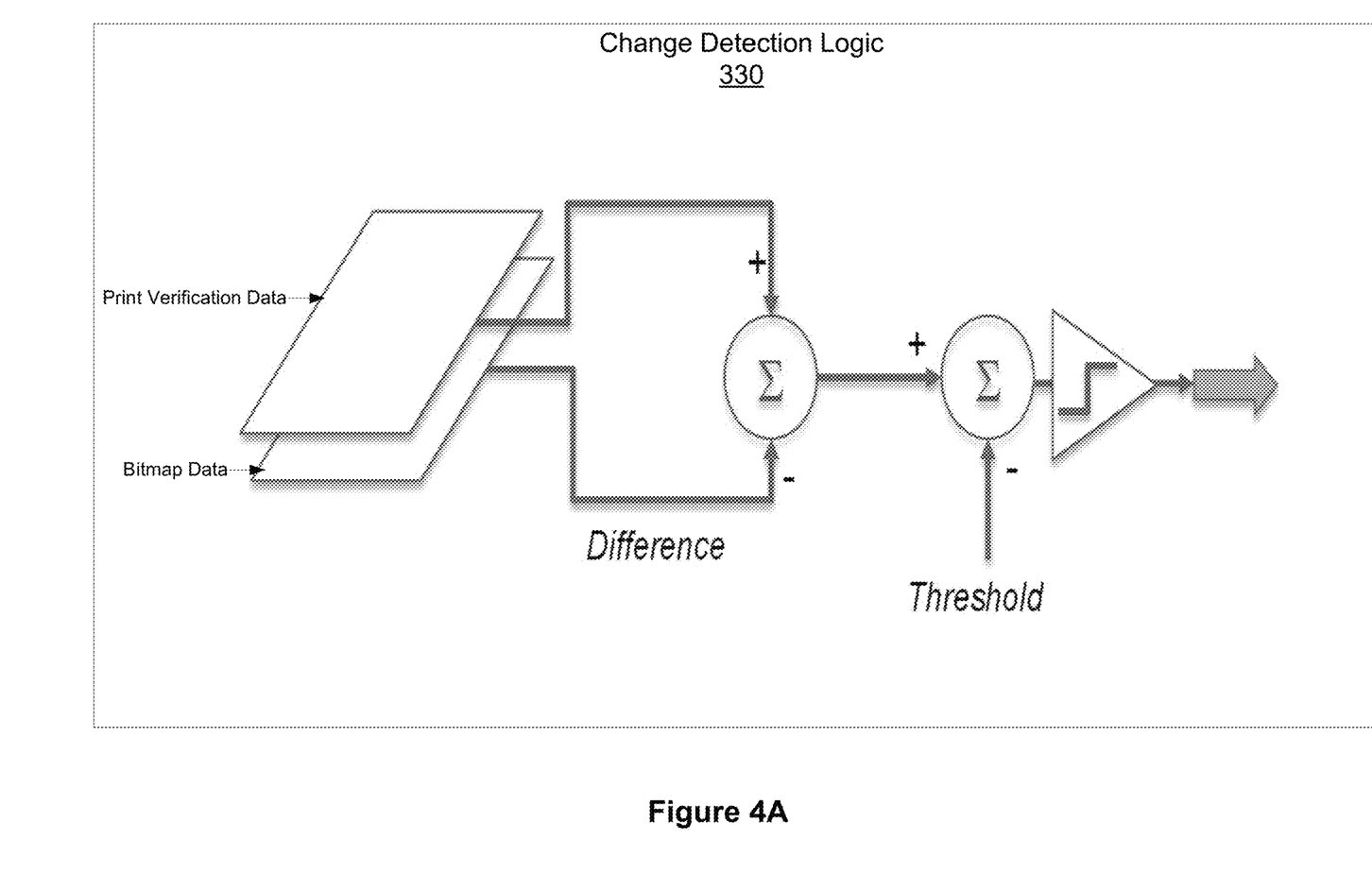
FIG. 4A illustrates one embodiment of a change detection mechanism.

Change detection logic 330 analyzes the print medium image data and the bitmap data to determine the difference between the images. In one embodiment, a difference between the images of print medium image data and a corresponding bitmap data constitutes a candidate defect. In a further embodiment, change detection logic 330 determines whether each detected candidate defect exceeds a predetermined color threshold value. In yet a further embodiment, the threshold value comprises a color threshold value entered by an operator at graphical user interface 230 in print controller 140 (FIG. 2). FIG. 4A illustrates one embodiment of change detection logic 330. As shown in FIG. 4A, the color threshold may be applied to the absolute value of the difference between the print medium image data and the bitmap data.

Referring back to FIG. 3, defect detection logic 340 determines the locations of each of the candidate defects, as well as identifies candidate defects at locations adjacent to the candidate defects (adjacent candidate defects). In one embodiment, defect detection logic 340 determines a size of the candidate defects, including the combined size of adjacent candidate defects. In such an embodiment, defect detection logic 340 determines the size of the candidate defects in a first direction corresponding to a cross-medium direction and a second direction corresponding to a medium transport direction. Subsequently, defect detection logic 340 determines whether each candidate defect is greater than a critical size threshold (e.g., received via graphical user interface 230). Candidate defects that are greater than the critical size threshold may be identified as defects, while candidate defects that are less than the critical size threshold may be identified as non-defects. In a further embodiment, defect detection logic may identify as defects only objects whose size exceeds a pre-determined threshold in both the cross-web and transport directions. The processing burden of subsequent steps may be reduced by only evaluating the candidate defects that are identified as defects.

In a further embodiment, defect detection logic 340 determines, for each defect, a region in the bitmap data that encompasses the defect, and computes an original image region variance (or original variance) value associated with the bitmap image in the bitmap data at the region. The region may be a subset of the image and the region includes the candidate defect location. Subsequently, defect detection logic 340 computes a difference image region variance (or difference variance) value associated with the difference of the print medium image data and bitmap image data images in the region of each defect. According to one embodiment, the difference variance value is separately computed about the mean of the difference image in the region of each defect for each color band (e.g., red, blue, green (RGB)).

Once the difference variance values have been computed, defect detection logic 340 determines for each defect whether the original variance value is greater than the difference variance value. As a result, defect detection logic 340 classifies each of the one or more defects as acceptable defects upon a determination that the original variance value is greater than the difference variance value; or unacceptable defects upon a determination that the original variance value is less than the difference variance value. Accordingly, a defect is classified as acceptable or unacceptable, depending on whether:

$$\sum_{r,g,b} v_0 > \alpha \sum_{r,g,b} v_\delta$$

where, $v_0$ is original image region variance with respect to its mean; $v\delta$ is the difference image region variance with respect to its mean, $\alpha$ is a gain adjustment factor that may be near 1; and r, g, b represent the scanner's spectral bands (e.g., color bands), which could include additional bands, e.g. a Visual band. The variances may be computed for each of a plurality of the color planes in the print image medium data and the bitmap image data (e.g., by summation of the variances corresponding to each of the plurality of color planes).

In another embodiment, defect detection logic 340 may implement a semi-automatic classification in which, a defect is identified as rejected (e.g., determined to be unacceptable in the finished product) upon a determination that $\Sigma_{r,g,b}v_0 < a_0\Sigma_{r,g,b}v_\delta$; a defect is identified as accepted (e.g., determined to be acceptable in the finished product) upon a determination that $\Sigma_{r,g,b}v_0 > a_1\Sigma_{r,g,b}v_\delta$, and a defect is identified as inspection needed upon a determination that $a_0\Sigma_{r,g,b}v_\delta < \Sigma_{r,g,b}v_0 < a_1\Sigma_{r,g,b}v_\delta$. In this case $a_0$ and $a_1$ are gain adjustment factors and $a_0$ is less than $a_1$. In this case, subsequent inspection (e.g., manual inspection) of the output will determine whether or not it is acceptable as finished product. In a further embodiment, defect detection logic 340 may determine defect classification based on comparing the variance of the difference image in the region of the defect (e.g., candidate defect) and the variance of bitmap image in the region of the defect. The classification of defects is improved by using image variances to account for the human visual perception characteristic that defects are less noticeable in a region of the image that is cluttered.

Figure 4B:
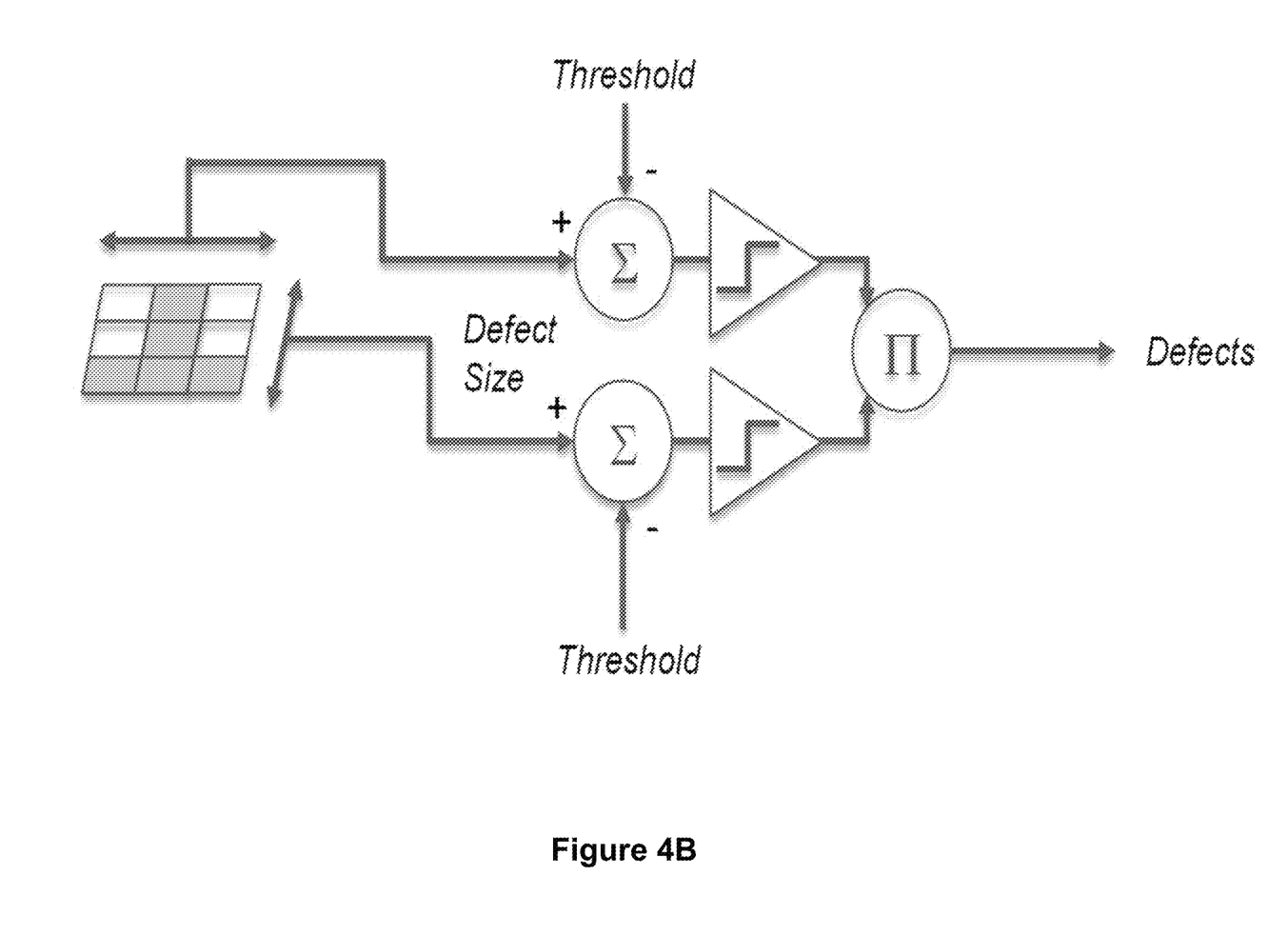
FIG. 4B illustrates one embodiment of a defect detection mechanism.

Once a defect has been classified, defect detection logic 340 transmits information regarding the classified defects. For example, the information may include classification information as to whether a defect exists, the classification type (e.g., acceptable, unacceptable and/or inspection needed), size, quantity, color channel, location, etc. FIG. 4B illustrates one embodiment of defect detection logic 340. In other embodiments, different color thresholds and critical size thresholds may be provided by graphical user interface 230 for each color plane to enable color plane analysis.

Figure 5:
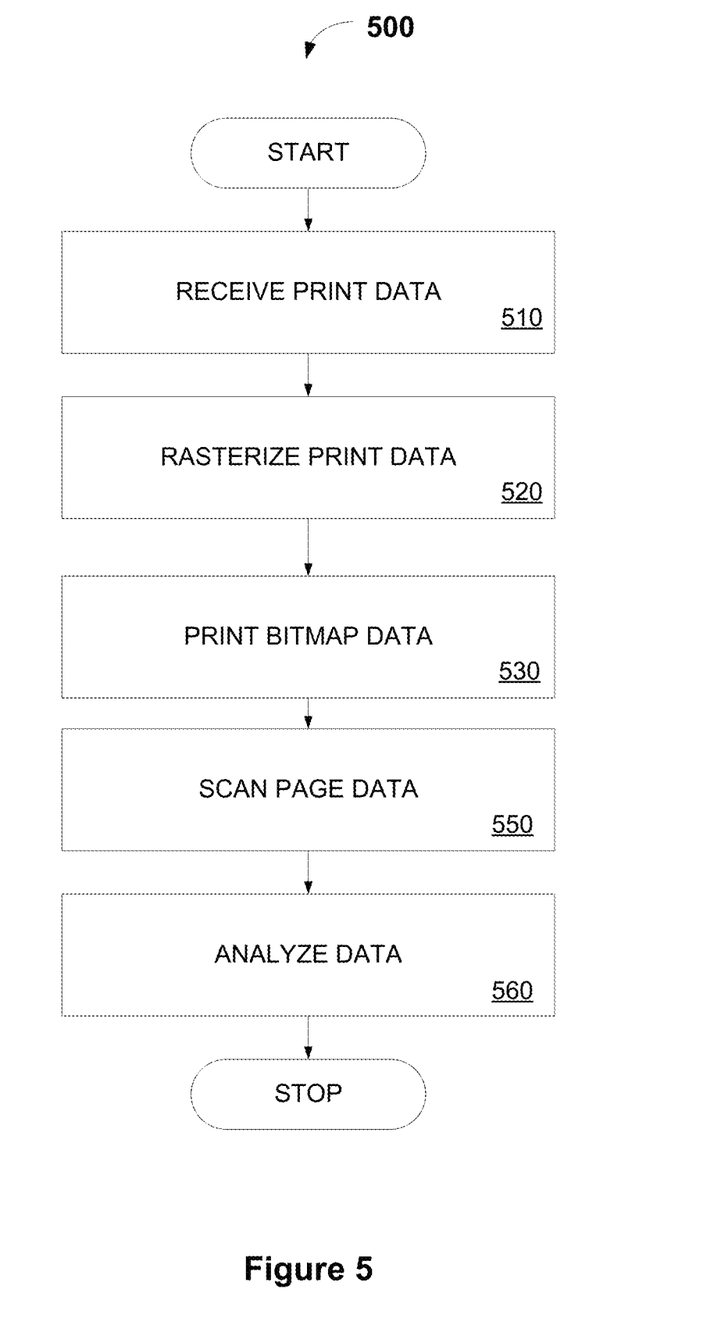
FIG. 5 is a flow diagram illustrating one embodiment of a method for processing print data.

FIG. 5 is a flow diagram illustrating one embodiment of a process 500 for processing print data. Process 500 may be performed by processing logic that may comprise hardware (e.g., circuitry, dedicated logic, programmable logic, etc.), software (such as instructions run on a processing device), or a combination thereof. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where print data is received. At processing block 520, the print data is rasterized into bitmap data. At processing block 530, the bitmap data is printed. Once the data bitmap data has been printed (e.g., applied to the medium), the data on each page (or page data) is scanned at print verification system to generate print medium image data, processing block 550. At processing block 560, the print verification system analyzes the print medium image data.

Figure 6:
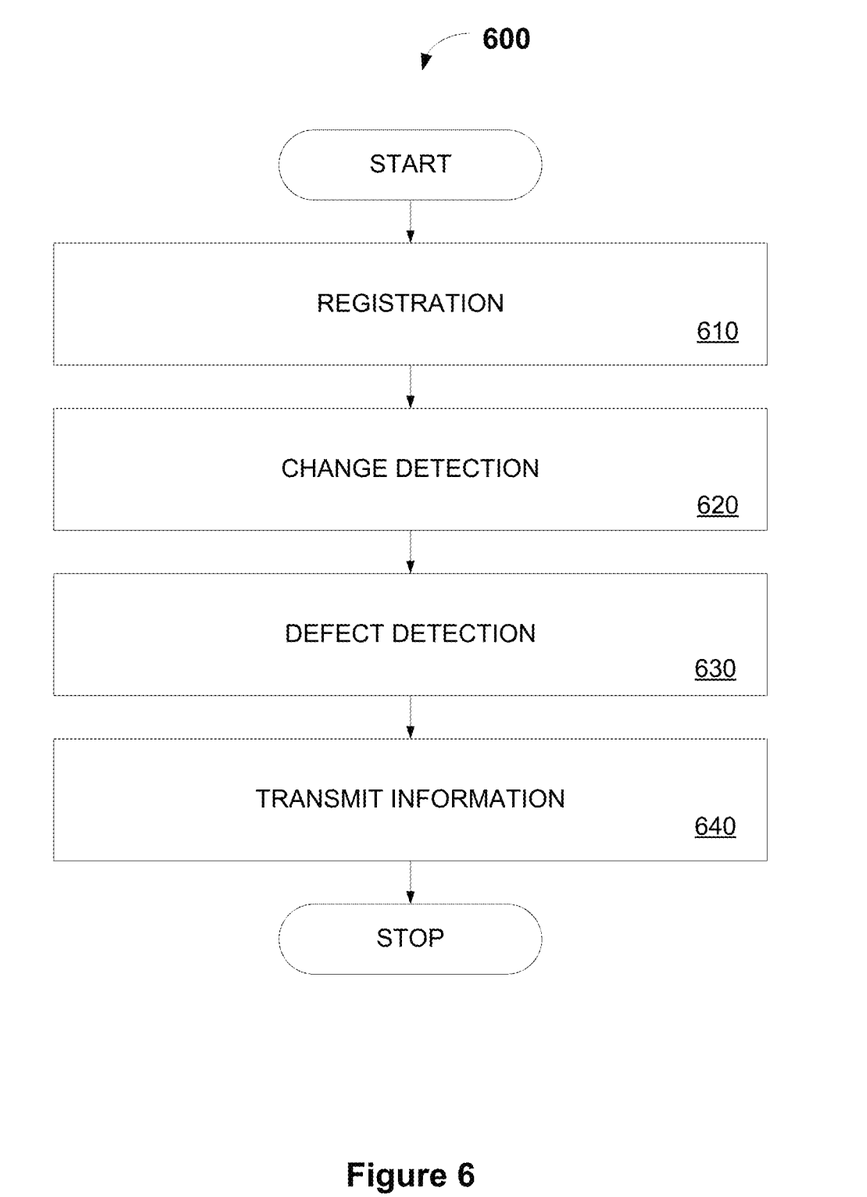
FIG. 6 is a flow diagram illustrating one embodiment of a method for analyzing scan data.

FIG. 6 is a flow diagram illustrating one embodiment of a process 600 for analyzing the scan data. Process 600 may be performed by processing logic that may comprise hardware (e.g., circuitry, dedicated logic, programmable logic, etc.), software (such as instructions run on a processing device), or a combination thereof. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 610, where the print medium image data is registered with the bitmap print data. As discussed above, registration may be implemented by performing color transformation, rotation, skew transformation, translation, and/or scaling operations to obtain a matched alignment between the print medium image and bitmap images. At processing block 620, change detection is performed to detect candidate defects. As discussed above, change detection involves analyzing the print medium image data and the bitmap data to detect one or more candidate defects (e.g., differences between the print medium image data and the bitmap data images) and determining whether any of the detected candidate defects' sizes exceed a predetermined threshold value.

Figure 7:
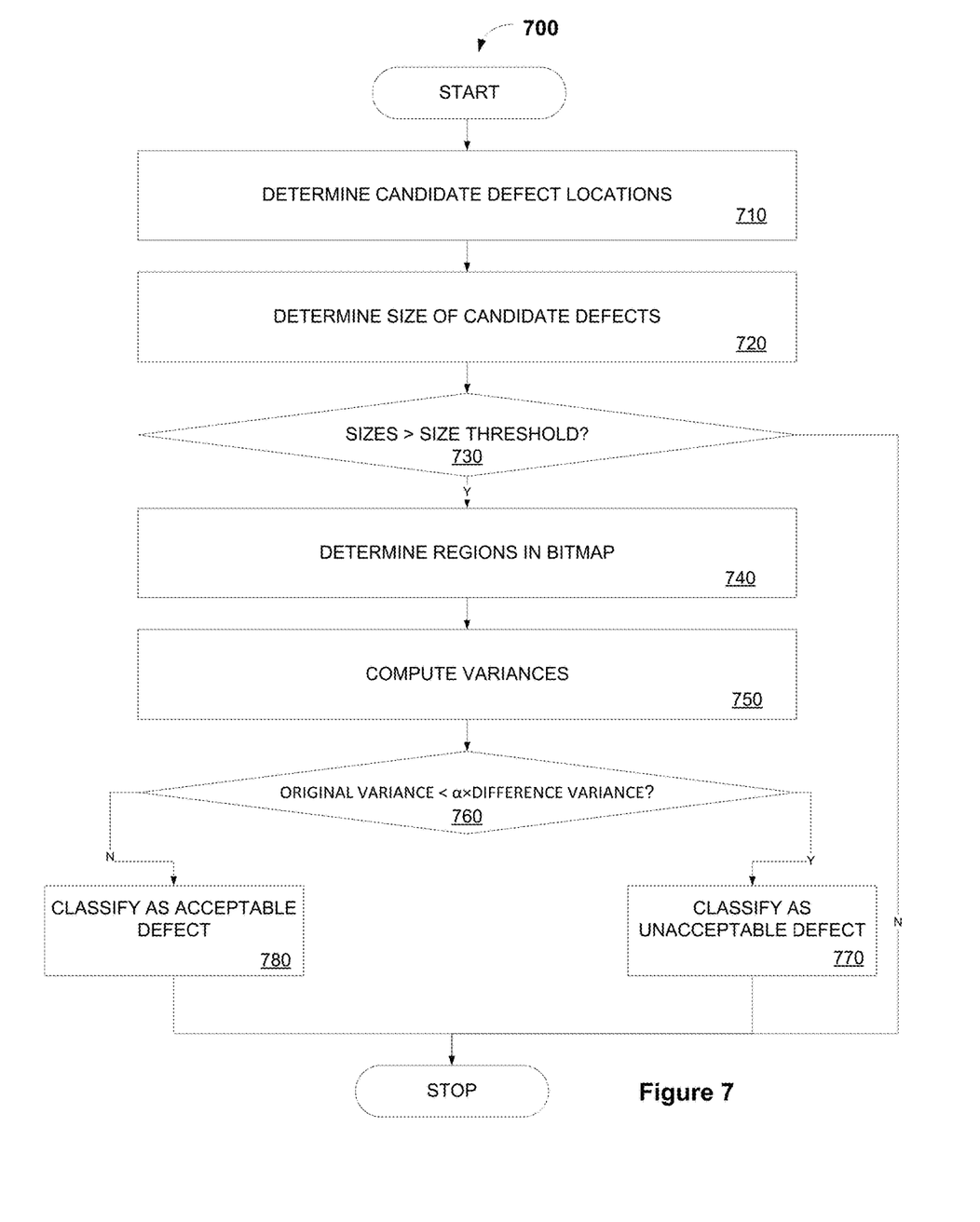
FIG. 7 is a flow diagram illustrating one embodiment of a process 700 for performing defect detection.

At processing block 630, defect detection is performed to detect one or more defects among the candidate defects. At processing block 640, information regarding the defects is transmitted (e.g., to host system 110 or print controller 140). FIG. 7 is a flow diagram illustrating one embodiment of a process 700 for performing defect detection. Process 700 may be performed by processing logic that may comprise hardware (e.g., circuitry, dedicated logic, programmable logic, etc.), software (such as instructions run on a processing device), or a combination thereof. The process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 are not discussed or repeated here.

Process 700 begins at processing block 710, where the locations of the candidate defects are determined. At processing block 720, the size of the candidate defects is determined (e.g., in multiple directions). As previously discussed, the candidate defect size may include the combined size of adjacent candidate defects. At decision block 730, a determination is made as to whether the candidate defect sizes exceed a critical size threshold. The process is completed for each candidate defect that has a size less than (or equal to) the critical size threshold since such candidate defects are not considered defects.

However, candidate defects that have a size greater than the critical size threshold are considered defects. Thus, regions in the bitmap data associated with regions of print medium image data that encompass each defect are determined, processing block 740. At processing block 750, the original variance and difference variance values are computed.

At decision block 760, a determination is made for each defect as to whether the original variance value is less than the difference variance value times—e.g., multiplied times a gain adjustment factor (e.g., that is approximately 1). All defects having an original variance value less than the difference variance value times the gain adjustment value may be classified as unacceptable defects, processing block 770. Otherwise, the defects may be classified as acceptable defects (e.g., original variance value is greater than the difference variance value times the gain adjustment value), processing block 780.

Figure 8:
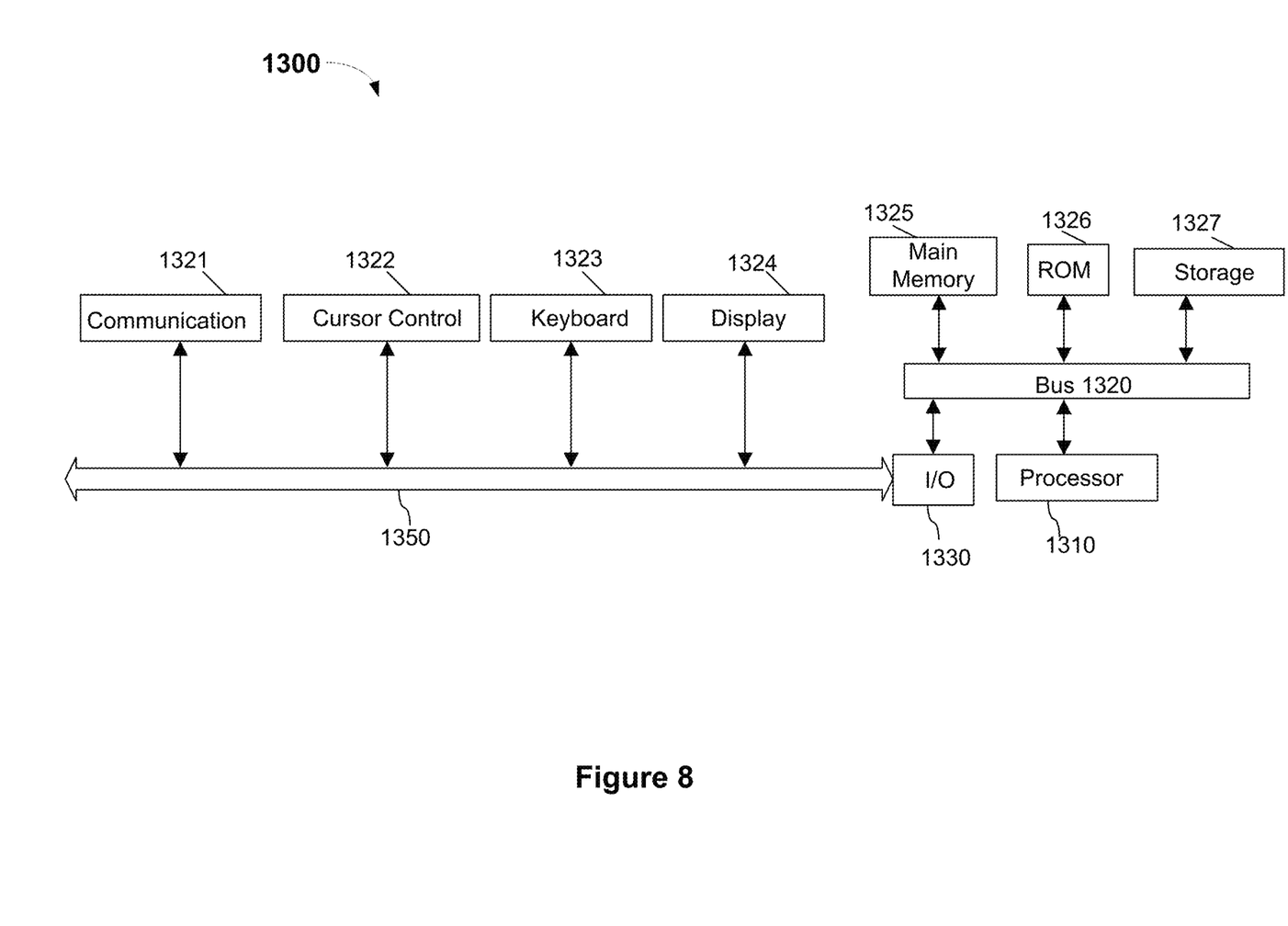
FIG. 8 illustrates one embodiment of a computer system.

FIG. 8 illustrates a computer system 1300 on which host system 110, printing system 130, print controller 140 and/or PVS 190 may be implemented. Computer system 1300 includes a system bus 1320 for communicating information, and a processor 1310 coupled to bus 1320 for processing information.

Computer system 1300 further comprises a random access memory (RAM) or other dynamic storage device 1327

(referred to herein as main memory), coupled to bus 1320 for storing information and instructions to be executed by processor 1310. Main memory 1325 also may be used for storing temporary variables or other intermediate information during execution of instructions by processor 1310. Computer system 1300 also may include a read only memory (ROM) and or other static storage device 1326 coupled to bus 1320 for storing static information and instructions used by processor 1310.

A data storage device 1327 such as a magnetic disk or optical disc and its corresponding drive may also be coupled to computer system 1300 for storing information and instructions. Computer system 1300 can also be coupled to a second I/O bus 1350 via an I/O interface 1330. A plurality of I/O devices may be coupled to I/O bus 1350, including a display device 1324, an input device (e.g., a keyboard 1323 (e.g., alphanumeric input device) and or a cursor control device 1322). The communication device 1321 is for accessing other computers (servers or clients). The communication device 1321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store defect detection logic and one or more processors coupled with the at least one physical memory device to execute the defect detection logic to receive one or more images of bitmap data applied to a print medium as print medium image data, register the print medium image data to the bitmap data, detect one or more candidate defects based on whether a difference between the print medium image data at a location and the bitmap data at the location exceeds a predetermined threshold, detect one or more defects among the candidate defects, including determining a size of a candidate defect, determining that the candidate defect comprises a defect upon a determination that the size of the candidate defect exceeds a critical size threshold, computing an original variance value associated with an image included in the bitmap data at a first region associated with the defect, computing a difference variance value associated with the bitmap data at the first region and the print medium image data at the first region and classifying the defect as an unacceptable defect upon a determination that the original variance value is less than the difference variance value multiplied times the gain value and transmit information about the one or more candidate defects classified as defects.

Example 2 includes the subject matter of Example 1, wherein determining the size of the one or more candidate defects comprises determining adjacent candidate defects.

Example 3 includes the subject matter of Examples 1 and 2, wherein determining that the candidate defect does not comprise a defect upon a determination that the size of the candidate defect does not exceed the critical size threshold.

Example 4 includes the subject matter of Examples 1-3, wherein the size of the candidate defect is determined in a first direction and a second direction, and wherein the first direction corresponds to a cross-medium direction and the second direction corresponds to a medium transport direction.

Example 5 includes the subject matter of Examples 1-4, wherein the system further determines a region in the bitmap data that encompasses the defect.

Example 6 includes the subject matter of Examples 1-5, wherein the system further classifies the defect as an acceptable defect upon a determination that the original variance value is greater than the difference variance value multiplied times the gain value.

Example 7 includes the subject matter of Examples 1-6, wherein registering the print medium image data to the bitmap data comprises performing color transformation, rotation, skew transformation, translation and scaling to obtain a matched alignment between the print medium image data and the bitmap data.

Example 8 includes the subject matter of Examples 1-7, wherein the threshold and the critical size threshold are received via a graphical user interface.

Example 9 includes the subject matter of Examples 1-8, further comprising a printer to print the bitmap images.

Example 10 includes the subject matter of Examples 1-9, wherein the original variance value and the difference variance value are computed for each of a plurality of color planes.

Some embodiments pertain to Example 11, a method comprising receiving one or more images of bitmap data applied to a print medium as print medium image data, registering the print medium image data to the bitmap data, detecting one or more candidate defects based on whether a difference between the print medium image data at a location and the bitmap data at the location exceeds a predetermined threshold, detecting one or more defects among the candidate defects, including determining a size of a candidate defect, determining that the candidate defect comprises a defect upon a determination that the size of the candidate defect exceeds a critical size threshold, computing an original variance value associated with an image included in the bitmap data at a first region associated with the defect, computing a difference variance value associated with the bitmap data at the first region and the print medium image data at the first region and classifying the defect as an unacceptable defect upon a determination that the original variance value is less than the difference variance value and transmitting information about the one or more candidate defects classified as defects.

Example 12 includes the subject matter of Example 11, wherein determining the size of the one or more candidate defects comprises determining adjacent candidate defects.

Example 13 includes the subject matter of Examples 11 and 12, wherein determining that the candidate defect does not comprise a defect upon a determination that the size of the candidate defect does not exceed the critical size threshold.

Example 14 includes the subject matter of Examples 11-13, wherein the size of the candidate defect is determined in a first direction and a second direction, and wherein the first direction corresponds to a cross-medium direction and the second direction corresponds to a medium transport direction.

Example 15 includes the subject matter of Examples 11-14, further comprising determining a region in the bitmap data that encompasses the defect.

Some embodiments pertain to Example 16, at least one computer readable medium having instructions stored thereon, which when executed by one or more processors, cause the processors to receive one or more images of bitmap data applied to a print medium as print medium image data, register the print medium image data to the bitmap data, detect one or more candidate defects based on whether a difference between the print medium image data at a location and the bitmap data at the location exceeds a predetermined threshold, detect one or more defects among the candidate defects, including determining a size of a candidate defect, determining that the candidate defect comprises a defect upon a determination that the size of the candidate defect exceeds a critical size threshold, computing an original variance value associated with an image included in the bitmap data at a first region associated with the defect, computing a difference variance value associated with the bitmap data at the first region and the print medium image data at the first region and classifying the defect as an unacceptable defect upon a determination that the original variance value is less than the difference variance value multiplied times the gain value and transmit information about the one or more candidate defects classified as defects.

Example 17 includes the subject matter of Example 16, wherein registering the print medium image data to the bitmap data comprises performing color transformation, rotation, skew transformation, translation and scaling to obtain a matched alignment between the print medium image data and the bitmap data.

Example 18 includes the subject matter of Examples 16 and 18, wherein the threshold and the critical size threshold are received via a graphical user interface.

Example 19 includes the subject matter of Examples 16-19, wherein the original variance value and the difference variance value are computed for each of a plurality of color planes.

Example 20 includes the subject matter of Examples 16-20, wherein determining the size of the one or more candidate defects comprises determining adjacent candidate defects.

Example 21 includes the subject matter of Examples 16-20, wherein the original variance value and the difference variance value are computed for each of a plurality of color planes.

Example 22 includes the subject matter of Examples 16-21, wherein determining the size of the one or more candidate defects comprises determining adjacent candidate defects.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential.

What is claimed is:

1. A system comprising:
    at least one physical memory device to store defect detection logic; and
    one or more processors coupled with the at least one physical memory device to execute the defect detection logic to:
        receive one or more images of bitmap data applied to a print medium as print medium image data;
        register the print medium image data to the bitmap data;
        detect one or more candidate defects based on whether a difference between the print medium image data at a location and the bitmap data at the location exceeds a predetermined threshold;
        detect one or more defects among the candidate defects, including:
            determining a size of a candidate defect;
            determining that the candidate defect comprises a defect upon a determination that the size of the candidate defect exceeds a critical size threshold;
            computing an original variance value associated with an image included in the bitmap data at a first region associated with the defect;
            computing a difference variance value associated with the bitmap data at the first region and the print medium image data at the first region; and
            classifying the defect as an unacceptable defect upon a determination that the original variance value is less than the difference variance value multiplied times a gain value; and
        transmit information about the one or more candidate defects classified as defects.

2. The system of claim 1, wherein determining the size of the one or more candidate defects comprises determining adjacent candidate defects.

3. The system of claim 2, wherein determining that the candidate defect does not comprise a defect upon a determination that the size of the candidate defect does not exceed the critical size threshold.

4. The system of claim 3, wherein the size of the candidate defect is determined in a first direction and a second direction, and wherein the first direction corresponds to a cross-medium direction and the second direction corresponds to a medium transport direction.

5. The system of claim 4, wherein the candidate defect does not comprise a defect upon a determination that either the first or the second size does not exceed the critical size threshold.

6. The system of claim 4, wherein the system further determines a region in the bitmap data that encompasses the defect.

7. The system of claim 6, wherein the system further classifies the defect as an acceptable defect upon a determination that the original variance value is greater than the difference variance value multiplied times the gain value.

8. The system of claim 1, wherein registering the print medium image data to the bitmap data comprises performing color transformation, rotation, skew transformation, translation and scaling to obtain a matched alignment between the print medium image data and the bitmap data.

9. The system of claim 1, wherein the threshold and the critical size threshold are received via a graphical user interface.

10. The system of claim 1, further comprising a printer to print the bitmap images.

11. The system of claim 1, wherein the original variance value and the difference variance value are computed for each of a plurality of color planes.

12. A method comprising:
receiving one or more images of bitmap data applied to a print medium as print medium image data;
registering the print medium image data to the bitmap data;
detecting one or more candidate defects based on whether a difference between the print medium image data at a location and the bitmap data at the location exceeds a predetermined threshold;
detecting one or more defects among the candidate defects, including:
determining a size of a candidate defect;
determining that the candidate defect comprises a defect upon a determination that the size of the candidate defect exceeds a critical size threshold;
computing an original variance value associated with an image included in the bitmap data at a first region associated with the defect;
computing a difference variance value associated with the bitmap data at the first region and the print medium image data at the first region; and
classifying the defect as an unacceptable defect upon a determination that the original variance value is less than the difference variance value multiplied times a gain value; and
transmitting information about the one or more candidate defects classified as defects.

13. The method of claim 12, wherein determining the size of the one or more candidate defects comprises determining adjacent candidate defects.

14. The method of claim 13, wherein determining that the candidate defect does not comprise a defect upon a determination that the size of the candidate defect does not exceed the critical size threshold.

15. The method of claim 14, wherein the size of the candidate defect is determined in a first direction and a second direction, and wherein the first direction corresponds to a cross-medium direction and the second direction corresponds to a medium transport direction.

16. The method of claim 15, wherein the candidate defect does not comprise a defect upon a determination that either the first or the second size does not exceed the critical size threshold.

17. The method of claim 15, further comprising determining a region in the bitmap data that encompasses the defect.

18. At least one non-transitory computer readable medium having instructions stored thereon, which when executed by one or more processors, cause the processors to:
receive one or more images of bitmap data applied to a print medium as print medium image data;
register the print medium image data to the bitmap data;
detect one or more candidate defects based on whether a difference between the print medium image data at a location and the bitmap data at the location exceeds a predetermined threshold;
detect one or more defects among the candidate defects, including:
determining a size of a candidate defect;
determining that the candidate defect comprises a defect upon a determination that the size of the candidate defect exceeds a critical size threshold;
computing an original variance value associated with an image included in the bitmap data at a first region associated with the defect;
computing a difference variance value associated with the bitmap data at the first region and the print medium image data at the first region; and
classifying the defect as an unacceptable defect upon a determination that the original variance value is less than the difference variance value multiplied times a gain value; and
transmit information about the one or more candidate defects classified as defects.

19. The computer readable medium of claim 18, wherein registering the print medium image data to the bitmap data comprises performing color transformation, rotation, skew transformation, translation and scaling to obtain a matched alignment between the print medium image data and the bitmap data.

20. The computer readable medium of claim 18, wherein the threshold and the critical size threshold are received via a graphical user interface.

21. The computer readable medium of claim 18, wherein the original variance value and the difference variance value are computed for each of a plurality of color planes.

22. The computer readable medium of claim 18, wherein determining the size of the one or more candidate defects comprises determining adjacent candidate defects.

* * * * *